(12) United States Patent
Daly

(10) Patent No.: US 10,690,165 B2
(45) Date of Patent: *Jun. 23, 2020

(54) TOGGLE FIXING

(71) Applicant: Fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 308 days.

This patent is subject to a terminal disclaimer.

(21) Appl. No.: 15/755,077

(22) PCT Filed: Sep. 12, 2016

(86) PCT No.: PCT/EP2016/071430
§ 371 (c)(1),
(2) Date: Feb. 25, 2018

(87) PCT Pub. No.: WO2017/055061
PCT Pub. Date: Apr. 6, 2017

(65) Prior Publication Data
US 2018/0258971 A1 Sep. 13, 2018

(30) Foreign Application Priority Data
Sep. 29, 2015 (DE) .......................... 10 2015 116 426

(51) Int. Cl.
F16B 21/00 (2006.01)
F16B 13/08 (2006.01)
(52) U.S. Cl.
CPC ................................ F16B 13/0808 (2013.01)

(58) Field of Classification Search
CPC .................................................. F16B 13/0808
(Continued)

(56) References Cited

U.S. PATENT DOCUMENTS 2,998,743 A   9/1961  Apfelzweig
3,288,014 A * 11/1966 Aackersberg ....... F16B 13/0808
                                                              411/344
(Continued)

FOREIGN PATENT DOCUMENTS

DE    11 21 792 A    1/1962
DE    87 02 073 U1   6/1987
(Continued)

OTHER PUBLICATIONS

Search Report for related German Patent Application No. 10 2015 116 425.6, dated Jun. 9, 2016.
(Continued)

Primary Examiner — Gary W Estremsky
(74) Attorney, Agent, or Firm — Renner, Otto, Boisselle & Sklar, LLP

(57) ABSTRACT

A toggle fixing for fixing to a panel which is accessible only from one side. The toggle fixing has a crosspiece and a strip which is flexible and, as a result, pivotally connected to the crosspiece and on which a sleeve is displaceable in the direction of the crosspiece. The sleeve is provided with a screw hole, so that a screw cannot be pushed through but rather needs to be screwed through the sleeve in order that it can be screwed into the crosspiece. The sleeve relieves the crosspiece of an axial force of the screw.

13 Claims, 3 Drawing Sheets

(58) Field of Classification Search
 USPC .................................................. 411/344, 346
 See application file for complete search history.

(56) References Cited

U.S. PATENT DOCUMENTS

| | | | | |
|---|---|---|---|---|
| 4,043,245 | A * | 8/1977 | Kaplan | ................... F16B 37/04 411/346 |
| 4,286,497 | A * | 9/1981 | Shamah | ................. F16B 37/04 411/342 |
| 4,859,129 | A | 8/1989 | Kraus | |
| 4,997,327 | A * | 3/1991 | Cira | ................... F16B 13/0808 411/340 |
| 6,913,430 | B2 * | 7/2005 | Ito | ...................... F16B 13/0808 411/340 |
| 2003/0118420 | A1 | 6/2003 | Ikuta | |
| 2006/0088399 | A1 | 4/2006 | Demeo | |

FOREIGN PATENT DOCUMENTS

| | | |
|---|---|---|
| DE | 299 22 513 U1 | 5/2001 |
| DE | 10 2009 006 542 A1 | 8/2009 |
| FR | 2 554 183 A1 | 5/1985 |
| FR | 2 608 723 A1 | 6/1988 |
| GB | 2 102 525 A | 2/1983 |
| NL | 1 006 746 C1 | 2/1999 |
| WO | 00/47847 A2 | 8/2000 |

OTHER PUBLICATIONS

IPRP (PCT/IPEA/409) for corresponding International Application PCT/EP2016/071430, dated Sep. 12, 2017.
International Search Report (with English Translation) corresponding International Application PCT/EP2016/071430, dated Dec. 9, 2016.

\* cited by examiner

TOGGLE FIXING

TECHNICAL FIELD OF INVENTION

The invention relates to a toggle fixing having the features described herein.

Toggle fixings are used for fixing to panels, for example drywall panels or plasterboard panels of a partition wall, that are accessible only on one side and the other side of which is inaccessible. The fixing of a toggle fixing is effected through a through-hole made in the panel and referred to herein as an insertion hole. Other fixing methods are not excluded.

DISCUSSION OF RELATED ART

A toggle fixing is known from patent specification DE 1 121 792. The known toggle fixing has a crosspiece with a screw hole which passes radially through the crosspiece in a centre, and a strip which is integral with the crosspiece and is flexible and therefore pivotally connected to the crosspiece. The strip is arranged on the crosspiece laterally of the screw hole and projects laterally from the crosspiece. As result of the pivotability, the crosspiece can be pivoted so as to be parallel and in lateral contact with the strip. For fixing to a panel, the crosspiece is pivoted so as to be parallel and in lateral contact with the strip and in that position inserted through an insertion hole in a panel, the crosspiece being held and pushed through the insertion hole with the aid of the strip. Once the crosspiece has passed through the panel, it is pulled back with the aid of the strip, whereupon it assumes a transverse position and engages behind the panel on an inaccessible side at two opposite locations of a rim of the insertion hole. A sleeve is displaceably arranged on the strip, which sleeve is pushed along the strip in the direction of the crosspiece into the insertion hole in the panel, the strip being held in place so that the crosspiece remains in contact with the inaccessible side of the panel. Ribbing on the strip holds the strip against the sleeve and the crosspiece in contact with the inaccessible side of the panel. Once the strip has been cut off on a side of the sleeve remote from the crosspiece, a screw can be inserted through the sleeve and screwed into the screw hole of the crosspiece. The screw can be used to fix an article to the toggle fixing and, via the latter, to the panel. When the screw is screwed into the screw hole of the crosspiece, a force is exerted on the crosspiece via the screw, which force pushes the crosspiece away from the inaccessible side of the panel and against which force the strip of the toggle fixing must hold the crosspiece.

The problem of the invention is at least to reduce such a force which a screw exerts on the crosspiece on being screwed into a screw hole of a crosspiece of a toggle fixing.

SUMMARY OF THE INVENTION

The toggle fixing according to the invention having the features of claim 1 has a crosspiece having a screw hole for screwing in a screw transversely with respect to the crosspiece. "Crosspiece" denotes an element which is longer in a longitudinal direction than in a direction transverse with respect to the longitudinal direction, so that it can be inserted in its longitudinal direction through an insertion hole and, when positioned transversely with respect to the insertion hole, engages over the rim thereof at two opposite locations. The crosspiece accordingly has a length in the direction of the longitudinal axis that is greater than the height and the width of the crosspiece. "Transversely" means especially radially or orthogonally with respect to the longitudinal axis of the crosspiece; an oblique position at an acute angle with respect to a radial or orthogonal is included. "Screw hole" means that a screw intended for use with the toggle fixing and forming a fixing unit together with the toggle fixing needs to be screwed into the screw hole by rotation and cannot be introduced into the screw hole without a rotational movement, so that the thread flanks of the screw enter into engagement with the wall of the screw hole. The screw hole can be threadless for screwing in a screw that itself cuts its counter-thread. A screw hole having an internal thread or having inward-facing elements for threaded engagement of a screw thread are equally possible.

Furthermore, the toggle fixing according to the invention has a strip for handling the toggle fixing during fixing, which strip is pivotally arranged on the crosspiece laterally of the screw hole of the crosspiece. The strip can be pivotally connected to the crosspiece, for example, with a joint or the like. Preferably the strip is in one piece with the crosspiece and, for example, produced in one piece with the crosspiece by injection-moulding from plastics. To enable the strip to pivot on the crosspiece or, conversely, the crosspiece to pivot on the strip, the strip is resiliently and/or plastically flexible. The strip is sufficiently resistant to bending that, with the aid of the strip, the crosspiece can be held in a position pivoted so as to be parallel to the strip to one side of the strip and pushed through an insertion hole. The strip can also be thought of as a shank or stem of the toggle fixing that is pivotable relative to the crosspiece.

On the strip there is displaceably arranged a sleeve having a through-hole which forms a screw hole of the sleeve through which a screw can be screwed. The screw hole of the sleeve is in alignment with the screw hole of the crosspiece when the strip on which the sleeve is displaceable projects from the crosspiece axially parallel with respect to the screw hole of the crosspiece. The screw hole of the sleeve and the screw hole of the crosspiece can be positioned shifted to the side to such an extent that a screw being screwed through the screw hole of the sleeve "hits" the screw hole of the crosspiece. Once the crosspiece held by the strip has been inserted through an insertion hole and the crosspiece has been pulled back with the aid of the strip, so that the crosspiece assumes a transverse position on an inaccessible side of the insertion hole and engages behind a rim of the hole, the sleeve is displaced on the strip and inserted into the insertion hole. Preferably the sleeve has a laterally projecting counter-bearing which is supported on an accessible side on a rim of the insertion hole, so that the sleeve cannot be pushed through the insertion hole. For example, the sleeve has a flange or a collar as counter-bearing. The screw hole of the sleeve also prevents the screw from being able to be pushed through the sleeve; the screw must be screwed through the sleeve in order that it can be screwed into the screw hole of the crosspiece. In that way, the sleeve prevents the screw from subjecting the crosspiece to a (high) axial force which is directed away from the inaccessible side of the panel having the insertion hole and against which the crosspiece would have to be held when the screw was screwed into its screw hole.

The screw hole of the sleeve, like the screw hole of the crosspiece, can be threadless for screwing through a screw having a thread which itself cuts a counter-thread. A screw hole having an internal thread or having one or more inward-facing elements for threaded engagement of a screw thread is also possible.

An embodiment of the invention provides that an inside width of the screw hole of the crosspiece is at least as large as an inside width of the screw hole of the sleeve. The inside width can be, for example, the width between elements in the longitudinal direction of the screw holes or other inward-facing elements in the screw holes for threaded engagement of a screw thread of a self-thread-cutting or self-tapping screw and/or ribs or other inward-facing elements in the screw holes running in the circumferential direction of the screw holes or helically for threaded engagement of a screw. Such an embodiment of the invention ensures that a screw having a thread diameter of a size such that it cannot be pushed through the screw hole of the crosspiece, but rather needs to be screwed in, also cannot be pushed through the screw hole of the sleeve but rather needs to be screwed through the screw hole of the sleeve in order that it can be screwed through the sleeve into the screw hole of the crosspiece.

To adapt to screws of different thread diameters, an embodiment of the invention provides a resiliently expandable screw hole in the sleeve. For example, the sleeve has at least one element that is resilient laterally with respect to the screw hole for threaded engagement of a screw that is arranged to be screwed through the screw hole of the sleeve.

A development of the invention provides that the resilient element has for threaded engagement of the screw an inner surface running obliquely with respect to the screw hole of the sleeve, which inner surface narrows the screw hole of the sleeve. The inner surface of the element that is resilient laterally with respect to the screw hole, which inner surface runs obliquely with respect to the screw hole, can narrow the screw hole in the direction of the crosspiece or in the opposite direction.

An embodiment of the invention provides that the strip has a sawtooth-like toothing and the sleeve has a locking catch which co-operates with the toothing of the strip so that the sleeve is displaceable along the strip only in the direction of the crosspiece, whereas the locking catch prevents displacement of the sleeve away from the crosspiece. Such an embodiment of the invention enables the crosspiece to be clamped in place with the sleeve via the strip against a hole rim on an inaccessible side of an insertion hole, for example of a panel.

An embodiment of the invention provides at least one anti-rotation element which projects outwards on or away from the sleeve and prevents the sleeve, when inserted into an insertion hole, from rotating with a screw when the screw is screwed through the screw hole of the sleeve. The anti-rotation element can be, for example, a rib running in the longitudinal direction of the sleeve or a laterally resilient spring tab which holds the sleeve fixed against rotation in the insertion hole or at least increases a torque of the sleeve in the insertion hole, so that the sleeve does not rotate in the insertion hole when the screw is being screwed through.

BRIEF DESCRIPTION OF THE DRAWINGS

The invention is explained in greater detail below with reference to an exemplary embodiment shown in the drawing, wherein.

DETAILED DESCRIPTION OF THE INVENTION

Figure 1:
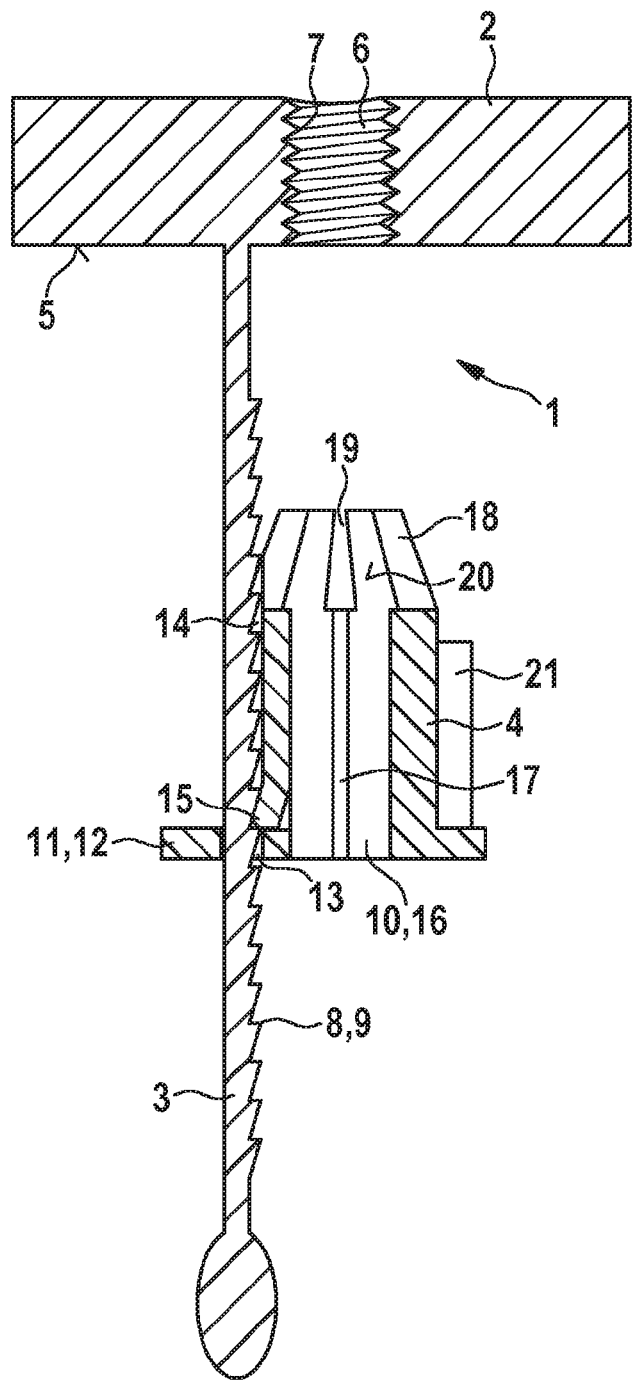
FIG. 1 shows an axial section through a toggle fixing according to the invention.
Figure 2:
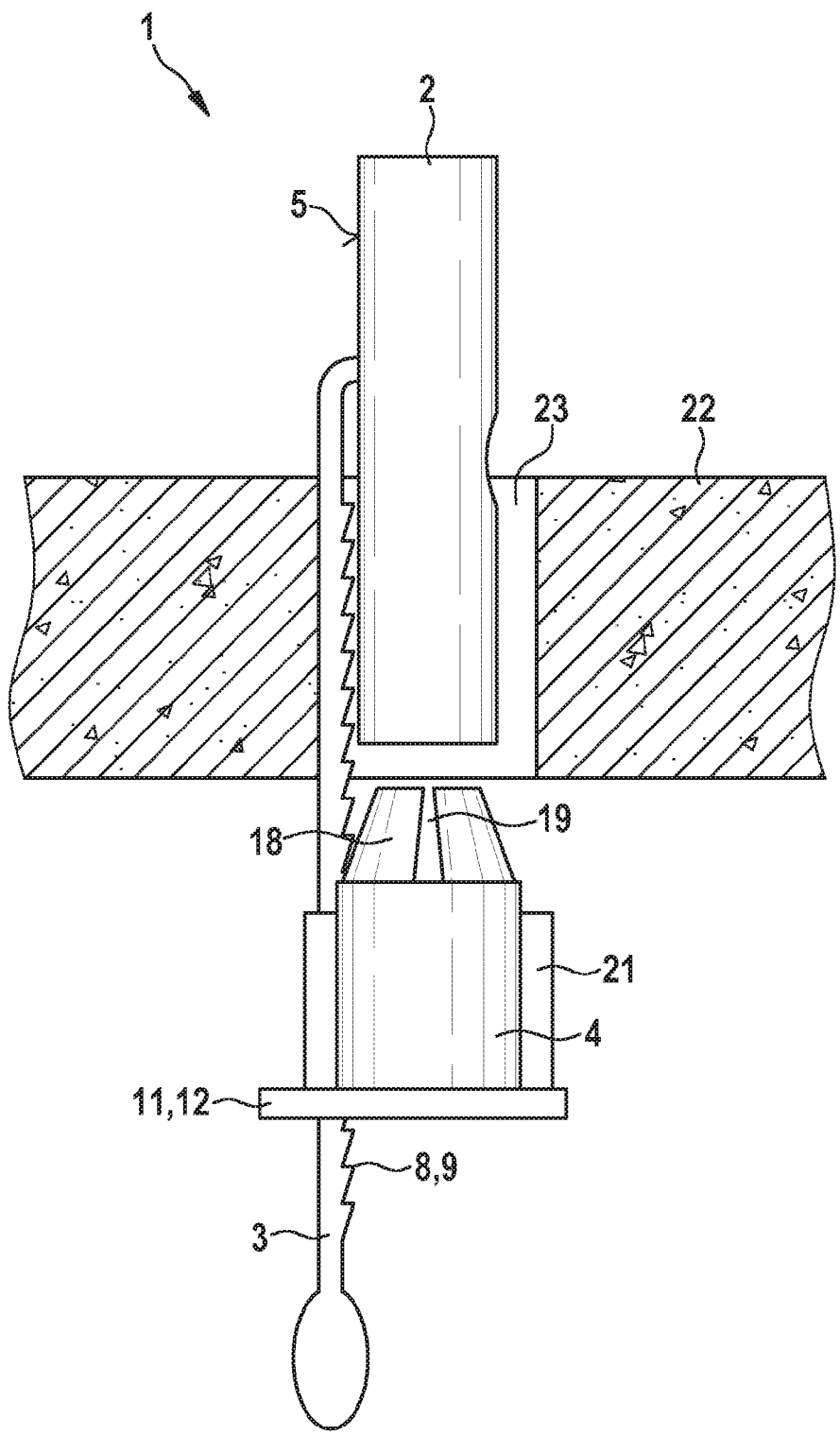
FIG. 2 shows a side view of the toggle fixing from FIG. 1 on insertion through an insertion hole.

The toggle fixing 1 according to the invention shown in FIG. 1 has a crosspiece 2, a strip 3 and a sleeve 4. In the exemplary embodiment the crosspiece 2 is cylindrical with a flattened side as contact face 5 and is longer than its diameter. It is not essential for the crosspiece 2 to have a cylindrical shape; generally the crosspiece 2 is longer than its dimensions transverse with respect to a longitudinal direction, so that it can be inserted in its longitudinal direction through a cylindrical insertion hole having a diameter that is smaller than a length of the crosspiece 2, so that the crosspiece 2, when positioned transversely with respect to the insertion hole, rests on two opposite locations of a hole rim. In a centre the crosspiece 2 has a screw hole 6 of the crosspiece 2, which hole passes radially through the crosspiece. In the exemplary embodiment the screw hole 6 of the crosspiece 2 has an internal thread 7. The screw hole 6 of the crosspiece 2 can, however, also be threadless for screwing in a self-cutting screw having a screw thread that itself cuts a counter-thread into the screw hole 6 of the crosspiece 2. Also possible are inward-facing lugs, tabs or tongues arranged in the screw hole 6 of the crosspiece 2 and running in the circumferential direction or helically for threaded engagement of a screw (not shown).

The strip 3 is arranged on the contact face 5 of the crosspiece 2, shifted in a longitudinal direction of the crosspiece 2 laterally next to the screw hole 6 of the crosspiece 2. The strip 3, at least in a portion adjoining the crosspiece 2, is resiliently and/or plastically flexible and therefore pivotally connected to the crosspiece 2. Also possible is an articulated connection of the strip 3 to the crosspiece 2 by means of a joint (not shown). In the exemplary embodiment the crosspiece 2 and the strip 3 have been produced in one piece by injection-moulding from plastics. In FIG. 1 the strip 3 projects from the contact face 5 of the crosspiece 2 at a right-angle and accordingly axially parallel to the screw hole 6 of the crosspiece 2. The crosspiece 2 is able to pivot through 90° so that its contact face 5 rests against the strip 3. The strip 3 has a toothing 8 in the manner of a rack; teeth 9 of the toothing 8 are sawtooth-shaped in the exemplary embodiment. The toothing 8 is located on a side of the strip 3 that faces towards an axis of the screw hole 6 of the crosspiece 2.

The sleeve 4 has a through-hole 10 which is in alignment with the screw hole 6 of the crosspiece 2 when the strip 3 projects at a right-angle from the crosspiece 2 and which therefore runs parallel to the axis of the screw hole 6 of the crosspiece 2. The sleeve 4 has a flange 11 at an end remote from the crosspiece 2, which flange can also be thought of as a counter-bearing projecting laterally from the sleeve 4. The strip 3 passes through an opening 13 in the flange 11 which has the same cross-section as the strip 11 with the toothing 8, so that the sleeve 4 is displaceably guided in the longitudinal direction of the strip 3. On a periphery of the sleeve 4, the strip 3 is located in an axially parallel groove 14, the cross-section of which corresponds to the cross-section of the strip 11 with the toothing 8.

The sleeve 4 has a radially resilient tab as locking catch 15 which co-operates with the toothing 8 of the strip 3 in the manner of a ratchet, so that the sleeve 4 is displaceable along the strip 3 in the direction of the crosspiece 2, whereas the locking catch 15 prevents displacement of the sleeve 4 away from the crosspiece 2.

The through-hole 10 of the sleeve 4 forms a screw hole 16 of the sleeve 4 for screwing through a screw which is arranged to be screwed into the screw hole 6 of the crosspiece 2. In the exemplary embodiment the screw hole 16 of the sleeve 4 has inward facing, axially parallel ribs 17 for threaded engagement of a screw thread of a self-cutting screw, the screw thread of which itself cuts a counter-thread into the ribs 17 and optionally into the sleeve 4. It is also possible for the screw hole 16 of the sleeve 4 to have an internal thread or inward-facing lugs, fins, sheet-metal inserts or the like running in a circumferential direction or helically for threaded engagement of a screw (not shown).

In addition, the sleeve 4 tapers in the direction of the crosspiece 2 in the shape of a hollow cone with elements 18 which are resilient in the radial direction and which in the exemplary embodiment are in one piece with the sleeve 4 and are separated from one another in the circumferential direction by longitudinal slots 19 that are open at a crosspiece-side end. Inner surfaces 20 of the resilient elements 18 run obliquely with respect to the sleeve 4 and narrow the screw hole 16 of the sleeve 4 in the direction of the crosspiece 2. The oblique inner surfaces 20 of the resilient elements 18 also serve for threaded engagement of a screw thread of a self-cutting screw.

Axially parallel ribs, as anti-rotation elements 21, project outwards from a periphery of the sleeve 4.

For fixing the toggle fixing 1 to a panel 22, for example a drywall panel or a plasterboard panel, the crosspiece 2 is pivoted on the strip 3 so that it is aligned parallel to the strip 3 and with its flattened side, which forms the contact face 5, resting against the strip 3 or the toothing 8 of the strip 3. In that position the crosspiece 2 is inserted through a through-hole in the panel 22, which hole is referred to herein as insertion hole 23, the crosspiece 2 being pushed through the insertion hole 23 with the aid of the strip 3 starting from an accessible side of the panel 22. An opposite side of the panel 22 need not be accessible.

Figure 3:
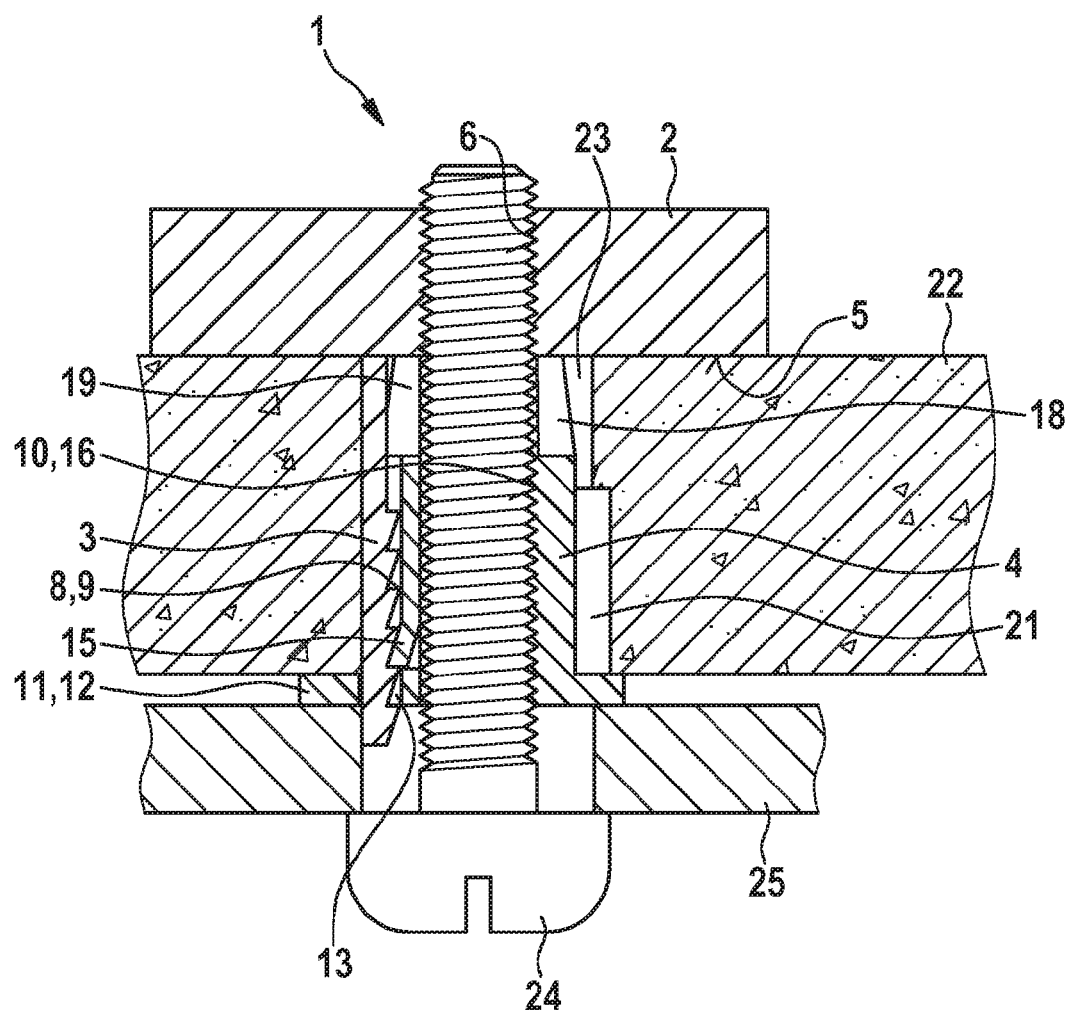
FIG. 3 shows an axial section through the toggle fixing from FIGS. 1 and 2 on being fixed at the insertion hole in a panel.

Once the crosspiece 2 has passed fully through the panel 22, as a result of an elasticity of the strip 3 the crosspiece assumes an oblique or transverse position and is pulled back with the aid of the strip 3 so that the crosspiece 2 comes to rest with its contact face 5 on the inaccessible side of the panel 22, as can be seen in FIG. 3. The crosspiece 2 assumes a position transverse with respect to the strip 3.

The sleeve 4 is displaced along the strip 3 in the direction of the crosspiece 2 and is inserted into the insertion hole 23 in the panel 22 so that its flange 11 rests against the accessible side of the panel 22. On displacement of the sleeve 4, the crosspiece 2 is held in place with the aid of the strip 3 so that it remains in contact with the inaccessible side of the panel 22. The locking catch 15 of the sleeve 4, co-operating with the toothing 8 of the strip 3, prevents the sleeve 4 from being displaced on the strip 3 away from the crosspiece 2, so that the crosspiece 2 of the toggle fixing 1 is held in contact with the inaccessible side of the panel 22. The flange 11 of the sleeve 4 resting against the accessible side of the panel 22 forms, as mentioned, a counter-bearing 12 for the contact with the panel 22.

The strip 3 is then cut off, torn off or separated in some other way on a side of the sleeve 4 remote from the crosspiece 2. A screw 24 for fixing an article 25, through which the screw 24 has been inserted, can then be screwed through the screw hole 16 of the sleeve 4 and screwed into the screw hole 6 of the crosspiece 2. During the screwing-in operation, the crosspiece 2 is held with the aid of the strip 3. Because the screw 24 cannot be pushed through the sleeve 4 but rather has to be screwed through the screw hole 16 of the sleeve 4, when it is screwed into the screw hole 6 of the crosspiece 2 it does not subject the crosspiece 2 to an axial force that pushes the crosspiece 2 away from the inaccessible side of the panel 22. The strip 3 is therefore largely relieved of load.

The ribs, which project outwards from the sleeve 4 and form the anti-rotation elements 21, become embedded in the panel 22 on insertion of the sleeve 4 into the insertion hole 23 and hold the sleeve 4 secure against rotation with the screw when the screw 24 is being screwed through.

LIST OF REFERENCE SYMBOLS

1 Toggle fixing
1 toggle fixing
2 crosspiece
3 strip
4 sleeve
5 contact face
6 screw hole of the crosspiece 2
7 internal thread
8 toothing
9 tooth
10 through-hole
11 flange
12 counter-bearing
13 opening
14 groove
15 locking catch
16 screw hole of the sleeve 4
17 rib
18 resilient element
19 longitudinal slot
20 inner surface
21 anti-rotation element
22 panel
23 insertion hole
24 screw
25 article to be fixed

The invention claimed is:

1. A toggle fixing for fixing to an insertion hole, having a crosspiece which has a screw hole for screwing in a screw transversely with respect to the crosspiece, having a strip for handling the toggle fixing, which strip is pivotally arranged on the crosspiece laterally of the screw hole of the crosspiece, and having a sleeve which is displaceably arranged on the strip and which has a through-hole which is in alignment with the screw hole of the crosspiece when the strip projects from the crosspiece axially parallel to the screw hole of the crosspiece, wherein the through-hole of the sleeve is a screw hole for screwing through a screw that is arranged to be screwed into the screw hole of the crosspiece and sized to be received in the through-hole, wherein the through-hole is formed to prevent the screw from being received in the through-hole without rotational movement of the screw.

2. The toggle fixing according to claim 1, wherein the sleeve has a laterally projecting counter-bearing for contact with a rim of an insertion hole through which the crosspiece is arranged to be inserted.

3. The toggle fixing according to claim 1 wherein an inside width of the screw hole of the crosspiece is at least as large as an inside width of the screw hole of the sleeve.

4. The toggle fixing according to claim 1, wherein the screw hole of the sleeve has at least one inward-facing element for threaded engagement of a screw.

5. The toggle fixing according to claim 1, wherein the screw hole of the sleeve is resiliently expandable.

6. The toggle fixing according to claim 1, wherein the sleeve has at least one element that is resilient laterally with respect to the screw hole for threaded engagement of a screw that is arranged to be screwed through the screw hole of the sleeve.

7. The toggle fixing according to claim 6, wherein the resilient element has for threaded engagement of the screw an inner surface running obliquely with respect to the screw hole of the sleeve, which inner surface narrows the screw hole of the sleeve.

8. The toggle fixing according to claim 1, wherein the strip has a rack-like toothing and the sleeve has a locking catch which co-operates with the toothing in the manner of a ratchet and which prevents displacement of the sleeve away from the crosspiece.

9. The toggle fixing according to claim 1, wherein the strip is in one piece with the crosspiece.

10. The toggle fixing according to claim 1, wherein the sleeve has at least one outwardly projecting anti-rotation element for securing the sleeve against rotation with a screw in an insertion hole, into which the sleeve has been inserted, when the screw is being screwed through the screw hole of the sleeve.

11. The toggle fixing according to claim 1, wherein a wall of the through-hole that defines the through-hole is formed to have threaded engagement with the screw.

12. A toggle fixing for fixing to an insertion hole, having a crosspiece which has a screw hole for screwing in a screw transversely with respect to the crosspiece, having a strip for handling the toggle fixing, which strip is pivotally arranged on the crosspiece laterally of the screw hole of the crosspiece, and having a sleeve which is displaceably arranged on the strip and which has a through-hole which is in alignment with the screw hole of the crosspiece when the strip projects from the crosspiece axially parallel to the screw hole of the crosspiece, wherein the through-hole of the sleeve is a screw hole for screwing through a screw that is arranged to be screwed into the screw hole of the crosspiece, wherein the screw hole of the sleeve has at least one inward-facing element for threaded engagement of a screw.

13. A toggle fixing for fixing to an insertion hole, having a crosspiece which has a screw hole for screwing in a screw transversely with respect to the crosspiece, having a strip for handling the toggle fixing, which strip is pivotally arranged on the crosspiece laterally of the screw hole of the crosspiece, and having a sleeve which is displaceably arranged on the strip and which has a through-hole which is in alignment with the screw hole of the crosspiece when the strip projects from the crosspiece axially parallel to the screw hole of the crosspiece, wherein the through-hole of the sleeve is a screw hole for screwing through a screw that is arranged to be screwed into the screw hole of the crosspiece, wherein the screw hole of the sleeve is resiliently expandable.

* * * * *